Aug. 18, 1959  O. NUEBLING  2,899,937
PRESSURE-OIL OPERATED ROTARY SERVO-MOTOR
Filed April 13, 1956
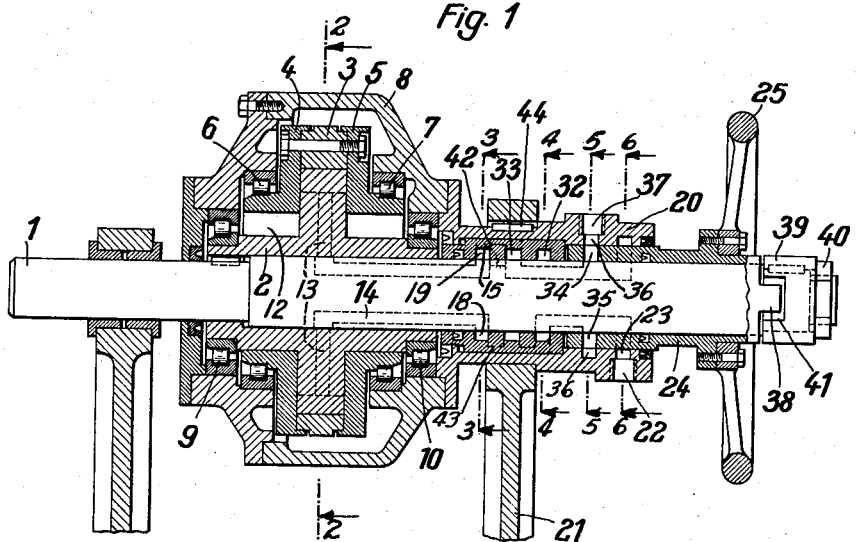
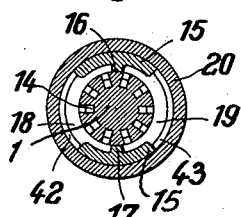
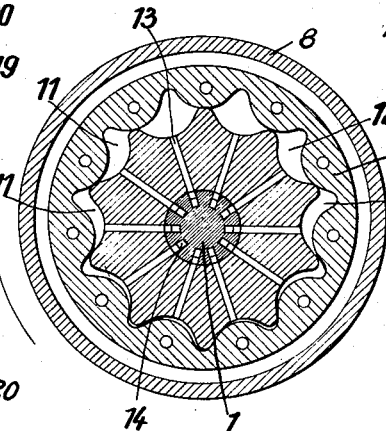
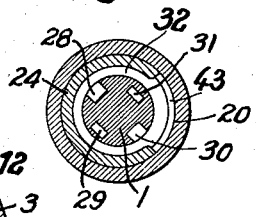
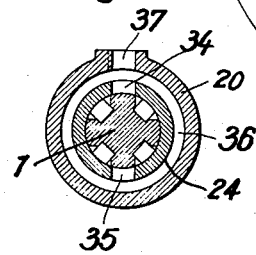
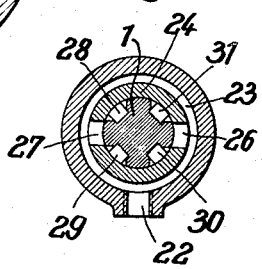
Inventor:
Otto Nuebling
By Ernest Montague
Attorney

United States Patent Office 2,899,937
Patented Aug. 18, 1959

2,899,937

PRESSURE-OIL OPERATED ROTARY SERVO-MOTOR

Otto Nuebling, Berlin-Frohnau, Germany, assignor to Hanomag Aktiengesellschaft, Hannover-Linden, Germany, a corporation of Germany Application April 13, 1956, Serial No. 578,116

Claims priority, application Germany April 15, 1955

3 Claims. (Cl. 121—39)

The present invention relates to a rotary servo-motor which is operated by means of pressure oil and which serves to increase an initially produced torque.

Such devices are used, for instance, for the actuation of a ship's rudder, in which case the helmsman has to apply a small force only to produce a great force on the ship's rudder, or these devices are employed in heavy duty vehicles to assist steering operations, or they are provided for follow-up controls of any kind.

It is known to increase forces through means of a cylinder and a piston and an operating fluid, oil for example. Such units comprise a control device, a cylindrical valve slide for instance, which is pressure-relieved, an oil piston from which the oil controlled by the valve slide is returned or to which it is supplied, and a return device which through means of the movement of the oil piston closes the opening section of the valve slide after the movement has been completed. These features can be found in any servo-motor; they are not part of the present invention.

It is one object of the present invention to provide a rotary servo-motor which produces a rotary movement directly on a shaft. In most cases such rotary servo-motors work at low speeds. Accordingly, high torques and forces, respectively, result. When oil pistons are used, the reciprocating motion of the oil piston must be transferred into a rotary movement. In this case, the acting forces are very great so that the transmission elements will be heavy and expensive. Even when using rotary piston units, transmission elements, as for instance gears, are necessary, since the conventional rotary piston units would be very expensive if they had to transmit the high torque directly.

It is, therefore, another object of the present invention, to provide internally and externally toothed gears for the rotary servo-motor in which the number of teeth differs by one and in which the fluid is metered and supplied to the working chambers of both gears by means of annular slide bushings. It is an advantage of this device that the shaft, which transmits the rotary movement, is arranged centrally in both gears, whereby the torque produced by the gears is directly transmitted also at low speeds. The control channels are arranged in the same shaft so that the whole unit is of small overall dimensions and easily installed. Furthermore, the invention allows for the transmission of a very high torque at very low speeds, and only two movable parts which are subjected to very high loads, are necessary.

It is yet another object of the present invention to provide a construction of the control device and of the return device, which is arranged around the shaft in form of concentric bushings. Thus, no linkage is necessary for the actuation of the return device.

With these and other objects in view which will become apparent in the following detailed description, the present invention will be clearly understood in connection with the accompanying drawings, in which:

Fig. 1 is a longitudinal sectional view of the rotary servo-motor,

Fig. 2 is a section along the lines 2—2 of Fig. 1;
Fig. 3 is a section along the lines 3—3 of Fig. 1;
Fig. 4 is a section along the lines 4—4 of Fig. 1;
Fig. 5 is a section along the lines 5—5 of Fig. 1; and
Fig. 6 is a section along the lines 6—6 of Fig. 1.

Referring now to the drawings, the externally toothed gear 2 is keyed on a shaft 1. An internally toothed gear 3 which has one more tooth than the gear 2, is bolted to covers 4 and 5 and arranged eccentrically relative to the inner gear, with bearings 6 and 7 in the housing 8. The housing 8 and the control sleeve 20 are bolted together. A key 44 prevents the housing 8 and the sleeve 20 from rotating in the bearing brackets 21. The inner gear 2 with bearings 9 and 10 is arranged in the same housing. Due to the eccentric arrangement of both bearings, the tooth chambers 11 and 12 are formed. The bores 13 and the longitudinal channels 14 end in each of the tooth chambers 11 and 12 respectively. The bushing 15 has ribs 16 and 17 which separate the pressure chamber 18 from the return chamber 19. The operating fluid, oil for example, passes from the pressure chamber 18 through the associated channels 14 into the tooth chambers 11, through which action both gears 2 and 3 and the drive shaft 1 which is keyed to the gear 2, are rotated, the latter in the direction indicated in Fig. 2. The decreasing tooth chambers 12 pass the pressure-relieved oil through the associated bores 13 and channels 14 into the return chamber 19. The bushing 15 is fixedly arranged in the sleeve 20. The pressure oil enters the bore 22 through the sleeve 20. According to the sectional view in Fig. 6, the entering oil is distributed around the control slide 24 by means of the groove 23. The control slide 24 produces the control impulse for the rotary servo-motor.

On a ship, the helmsman actuates this control slide 24, and in a vehicle the driver operates the slide 24 through means of a steering wheel 25. Two openings 26 and 27, respectively, lead from the control slide 24 to the drive shaft 1, on which four longitudinal grooves 28, 30, and 29, 31, respectively, are in communication with the annular chambers 32 and 33. The annular chamber 32 is shown in a sectional view in Fig. 4.

When the control slide 24 is rotated, the openings 27 and 26 communicate with the channels 28 and 30, or 29 and 31, according to the direction of rotation, so that, according to this movement of the control slide 24, the channel 33 or 32 receives pressure oil. Since the channels 32 and 33 have recesses 42 and 43, respectively, which are in communication with the chambers 18 or 19, the pressure oil, according to the direction of rotation of the control slide 24, is supplied either into the tooth chambers 11 or into the tooth chambers 12 and the rotary servo-motor is rotated forward or backward.

Fig. 5 shows similar openings 34 and 35, respectively, which are connected with the annular chambers 36 and the oil outlet 37. It follows, that upon rotation of the control slide 24, both openings 34 and 35 are connected with the second pair of the longitudinal grooves to pass off the oil which is displaced by the decreasing tooth chambers.

At its right hand end, the control slide 24, which is bolted to the hand wheel 25, has a projection 38. The bushing 39, keyed to the shaft 1 on its right hand end, is fixedly connected with the nut 40 and has a recess 41, the circumference of which is greater than the width of the projection 38. Since the channels 28, 30 and 29, 31, respectively, are symmetrically arranged in the shaft 1, the control slide 24 is not subjected to any load which would have to be overcome when actuating the hand wheel 25. The shaft 1 follows each rotary movement of the wheel 25 with great force and closes the openings 27, 26 and 34, 35, respectively, after the shaft has rotated as far as the hand wheel 25 did. Only in case of failure of the pressure oil supply to the bore 22, the projection 38 with the recess 41 comes into action. In such case the projection 38 takes the shaft 1 along through means of the bushing 39. Thus, the driver of a road vehicle can control his vehicle even if for any reason the pressure oil supply should break down. In this case, the driver has to apply all of the necessary steering force on the hand wheel.

While I have disclosed one embodiment of the present invention, it is to be understood that this embodiment is given by example only and not in a limiting sense, the scope of the present invention being determined by the objects and the claims.

I claim:

1. A pressure oil operated rotary servo-motor comprising a housing, a shaft rotatably projecting through said housing, a control sleeve immovably secured to said housing and disposed concentrically on said shaft, an externally toothed gear keyed to and rotatable with said shaft and an internally toothed gear disposed eccentrically in relation to and meshing with said externally toothed gear for relative rotation with the latter, the number of teeth on said gears differing by one, both said gears defining tooth chambers therebetween, bearing means disposed in said housing for both said gears, a bushing secured to said control sleeve around said shaft and defining a pressure chamber and a return chamber, respectively, said shaft having axially disposed channels for communication between said tooth chambers and said pressure chamber and said return chamber, respectively, and providing direct power transmission and a control slide rotatably disposed between said sleeve and said shaft and having annular chambers communicating with axially disposed channels in said shaft and an inlet and an outlet disposed in said control sleeve, respectively, and the latter controlling selectively the flow of pressure oil to said tooth chambers.

2. The servo-motor, as set forth in claim 1, which includes control ledges disposed in said bushing in order to separate said pressure chamber from said return chamber.

3. The servo-motor, as set forth in claim 1, wherein said control sleeve is rotatably journalled on said shaft, thereby supplying and passing off pressure oil through means of two longitudinally displaced pairs of openings and two pairs of longitudinal grooves of said shaft passing the feed and return oil controlled by said control sleeve to said non-rotatable bushing, the latter supplying and returning said pressure oil to and from the said tooth chambers.

References Cited in the file of this patent

UNITED STATES PATENTS

| | | |
|---|---|---|
| 457,294 | Tilden | Aug. 4, 1891 |
| 789,836 | Bodenlos | May 16, 1905 |
| 1,657,412 | Schneider | Jan. 24, 1928 |
| 1,682,563 | Hill | Aug. 28, 1928 |
| 1,947,991 | Jessup | Feb. 20, 1934 |
| 2,138,050 | Vickers | Nov. 29, 1938 |